Figure 1:
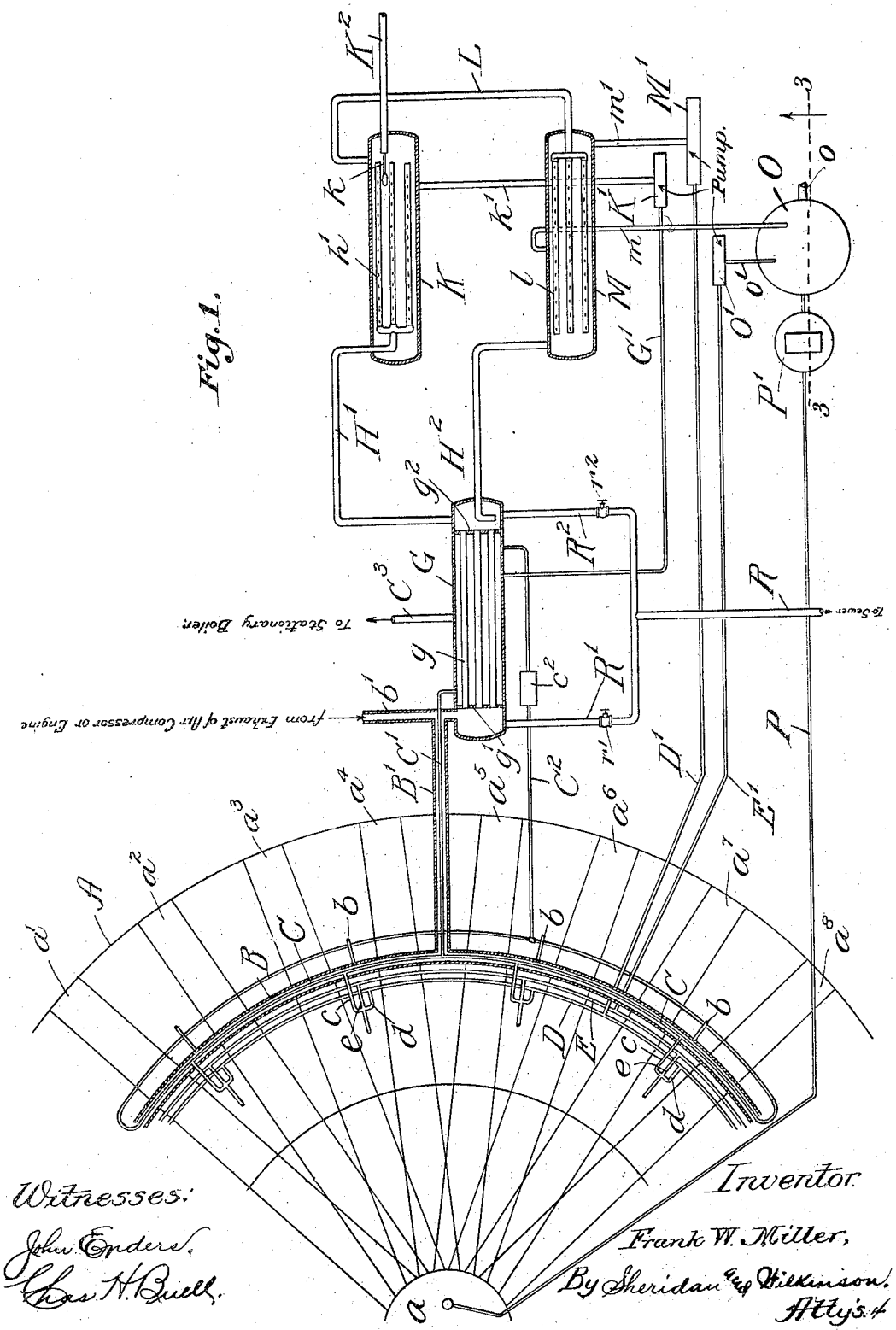

F. W. MILLER.
LOCOMOTIVE WASHOUT AND REFILLING SYSTEM.
APPLICATION FILED JUNE 7, 1907.

934,742.

Patented Sept. 21, 1909.
2 SHEETS—SHEET 2.

Witnesses:
John Enders
Chas. H. Buell

Inventor:
Frank W. Miller,
By Sheridan & Wilkinson
Atty's

UNITED STATES PATENT OFFICE.

FRANK W. MILLER, OF CHICAGO, ILLINOIS.

LOCOMOTIVE WASHOUT AND REFILLING SYSTEM.

934,742.     Specification of Letters Patent.     Patented Sept. 21, 1909.

Application filed June 7, 1907. Serial No. 377,773.

*To all whom it may concern:*

Be it known that I, FRANK W. MILLER, a citizen of the United States, residing at Chicago, in the county of Cook and State of Illinois, have invented certain new and useful Improvements in Locomotive Washout and Refilling Systems, of which the following is a specification.

My invention relates in general to locomotive washout and refilling systems, and more particularly to such systems in which the heat of the discharged fluids is utilized to heat the feed water and the washout water.

It is necessary that locomotives should, at frequent intervals, be entirely blown out to remove the foul water, and then washed to free them from sludge and scale, after which they are filled with fresh water. These operations are performed at the roundhouses between the trips of the locomotives. It is desirable that the washout water should be hot in order to more quickly and thoroughly clean the boilers and also to prevent injury through uneven contraction of the plates and tubes which occurs when cold water is used to wash out. It is also desirable that the feed water should be heated in order to save the time and fuel necessary to convert cold water into steam. It has, therefore, been proposed to impart the heat of the discharged fluids to the washout water and feed water, thereby through the utilization of heat which would otherwise be wasted, economizing in the time required in washing out and refilling locomotive boilers, and saving in the consumption of fuel necessary to generate steam. It is further desirable not only to utilize the heat of the discharged fluids, but also to use the discharged fluids themselves to furnish the washout water and to supply part of the feed water, thereby resulting in a great saving of water and a consequent reduction in the expense incident to refilling locomotive boilers.

The primary object of my invention is to provide a system for washing out and refilling locomotive boilers in which not only the heat of discharged fluid from the boilers, but the fluids themselves, will be utilized to the fullest possible degree, thereby reducing to a minimum the time and expense necessary to performing the operations of discharging the foul water, cleaning out the boilers and refilling them with fresh feed water.

A further object of my invention is to utilize the drainage water which accumulates in the roundhouse pit to reduce to the desired temperature washout water derived from the boiler discharged, thereby obviating the necessity of fresh cold water being mixed with the washout water to reduce the temperature thereof.

My invention will be more fully described hereinafter with reference to the accompanying drawing, in which—

Figure 2:
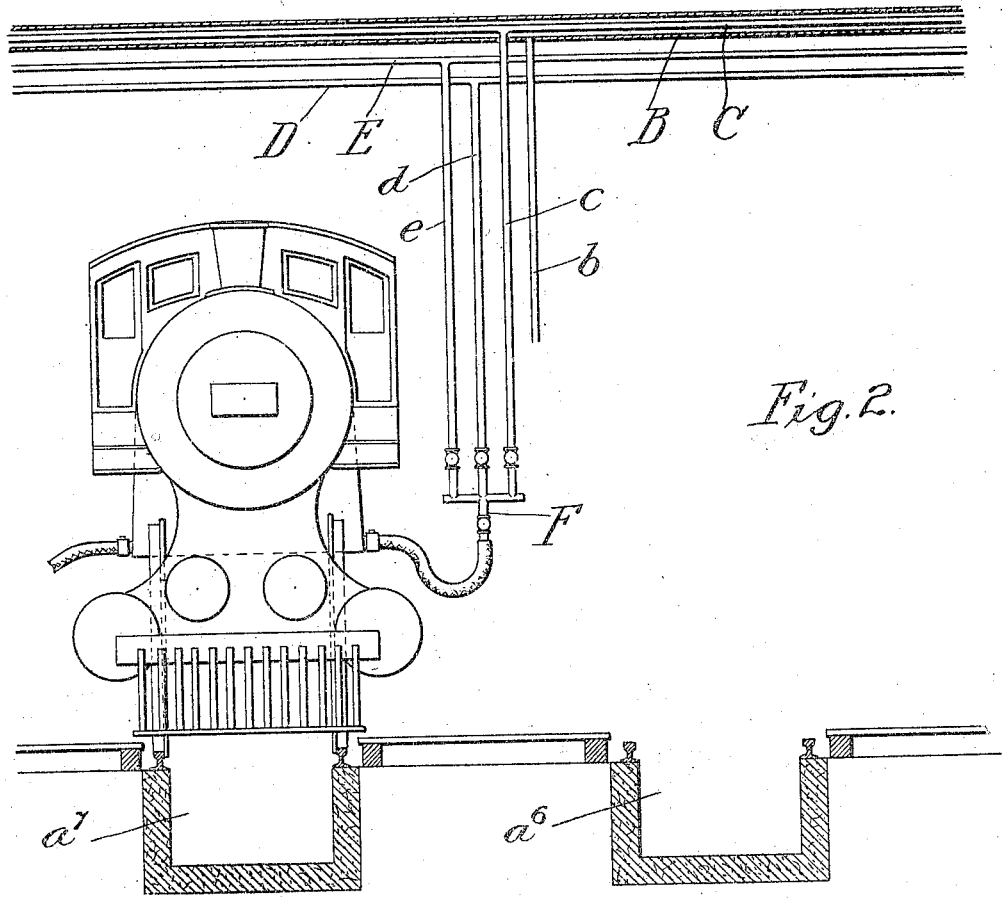
Figure 3:
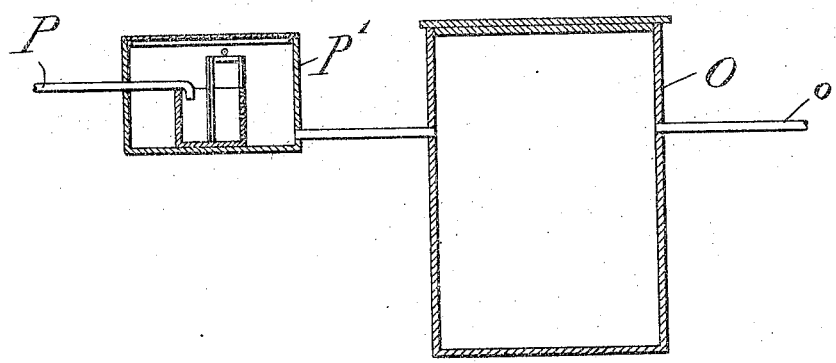

Figure 1 is a diagrammatic view illustrating my improved system; Fig. 2 an elevational view, parts being shown in vertical section; and Fig. 3 an enlarged vertical section on line 3, 3 Fig. 1.

Reference character A indicates a portion of a roundhouse, while reference characters $a'$ to $a^8$ indicate the pits in the roundhouse over which the locomotives are located while being washed out and refilled.

B indicates a conduit extending within the roundhouse adjacent to the several pits and with which the locomotive boilers are connected to discharge the steam and foul water therefrom. A coupling, such as indicated at $b$, is provided between the adjacent pits and communicating with the blow-out conduit B, so that the locomotives above the several pits may be connected with the blow-out conduit. B' indicates a branch conduit extending from the blow-out conduit B and communicating with a feed water heater G. The feed water heater may be of any suitable construction, and is shown as comprising headers $g'$ and $g^2$ with which are connected tubes $g$ through which the discharge fluids pass. After the fluids pass through the tubes $g$ of the heater, the steam passes through the conduit H' which terminates in a plurality of perforated pipes $h'$ located within a closed reservoir K. A conduit $K^2$ communicates with the interior of the reservoir K for supplying fresh water to the interior thereof, the supply of fresh water being automatically controlled by the level of the water within the reservoir through any suitable float valve, such as indicated at $k$. The steam passing through the perforations in the pipes $h'$ into contact with the fresh water in the reservoir K is to a large extent condensed, thereby forming a part of the feed water. The feed water so formed is drawn from the reservoir K through the conduit $k'$ by a pump K', of any suitable construction, and is forced by the pump through the conduit G' to the space within the heater G around the tubes g.

The feed water passes from the heater G through the branched conduit C' to the conduit C, which is located within the roundhouse and extends adjacent the several pits therein. Branch pipes c communicate with the conduit C and are located between the several pits. In order to superheat the feed water, the branch conduit C' and conduit C are located within the branch conduit B' and conduit B through which the discharged fluids pass from the boilers. If desired, the exhaust steam from the pump engines and air compressor usually employed in a roundhouse may be passed through the heater G, and for this purpose a branch conduit b' communicates with the blow-out branch conduit B'. Feed water may, if desired, be supplied from the heater G through a conduit $C^3$ to the usual stationary boiler employed in a roundhouse.

In order to keep the feed water in continual circulation through the heater G, a return conduit $C^2$ leads from the conduit C and communicates with the heater G, a pump $c^2$ being located in the branch conduit $C^2$ to maintain the circulation of the feed water through the heater and thereby maintain it at a high temperature at all times. The branch conduit $C^2$ is preferably divided so as to extend from the opposite ends of the conduit C and thereby keep the feed water in circulation throughout the conduit C.

The discharged liquids, from which the steam has separated, flow from the heater G through the conduit $H^2$ to a reservoir M in which is located a series of perforated pipes l with which a conduit L communicates, such conduit leading from the top of the reservoir K and conveying to the interior of the reservoir M the steam which is uncondensed by the water in the reservoir K, such surplus steam, therefore, serving to add to the volume of the filtered discharge liquid in the reservoir M. The water in the reservoir M is used to wash out the boilers of the locomotives after the foul water has been blown out. A pump M', of any suitable construction, draws the washout water from the reservoir M through the conduit m' and forces the same through the branch conduit D', which communicates with a conduit D located within the roundhouse and extending adjacent the several pits therein. Pipes d communicate with the conduit D and are located between the pits in the roundhouse.

The washout water used in a roundhouse is ordinarily allowed to flow to a pit a and to then be discharged to a sewer. By my improved system this drainage water is purified and then used to reduce the temperature of the washout water. To this end I provide a conduit P leading from the pit a of the roundhouse to a filter P', of any suitable construction, from which the drainage water flows to a reservoir O, such reservoir being provided with an overflow pipe o. The purified drainage water is drawn from the reservoir O by a pump O' through the conduit o', and then forced through the branch conduit E' to a conduit E located within the roundhouse and extending adjacent the several pits therein. Pipes e communicate with the conduit E and are located between the several pits.

The pipes c, d and e between the adjacent pits are provided with valves and all communicate with a common outlet pipe F, which is also provided with a valve. The outlet pipe F is adapted to be connected with the boiler of the locomotive above either of the adjacent pits, and by adjusting the valves in the pipes c, d and e, feed water may be supplied to the boilers, or washout water, or a combination of washout water and purified drainage water, so that the temperature of the washout water may be reduced to the desired degree.

The sludge and scale are discharged from the feed water heater G through pipes R' and $R^2$ leading from the opposite ends of the heater, such discharge pipes, preferably, communicating with a common pipe R leading to the sewer. Valves $r^1$ $r^2$ are provided in the discharge pipes R' and $R^2$, so that the sludge and scale may be discharged from the opposite ends of the heater.

From the foregoing description, it will be observed that I have invented an improved system for discharging, washing out and refilling locomotive boilers, by means of which not only the heat of the discharged fluids is fully utilized, but also the discharged fluids themselves, the steam being condensed through contact with fresh water to form the feed water, the discharged liquids being used for washout water and the drainage water being purified and then utilized to reduce the washout water to the desired temperature. It will also be evident that in my improved system the feed water is not only heated by the discharged steam condensed therewith but also by being passed through the feed water heater and thence passed within the conduit through which the fluids are discharged from the boilers. It will further be observed that in my improved system the feed water is kept in constant circulation through the heater, so as to be at all times at the highest possible temperature for use in refilling the boilers.

While I have illustrated and described my invention as applied to discharging, cleaning and refilling the boilers of locomotives, yet it will be understood that my invention is applicable to stationary boilers, and I, therefore, do not wish to be understood as limiting my invention in its application to locomotive roundhouses.

Having now fully described my invention, what I claim as new and desire to secure by Letters Patent, is—

1. In an apparatus for discharging, cleaning and refilling boilers, the combination with means for separating the discharged steam from the discharged liquid, of means for utilizing the discharged liquid as washout water, means for passing the discharged steam through fresh feed water, and means for mingling the steam rising uncondensed from the feed water with the washout water.

2. In an apparatus for discharging, cleaning, and refilling boilers, the combination with means for separating the discharged steam from the discharged liquid, of means for utilizing the discharged liquid as washout water, means for passing the discharged steam through fresh feed water, means for mingling the steam rising uncondensed from the feed water with the washout water, and means for conducting the feed water to the boiler through, without mingling it with, the fluids discharged from the boiler.

3. In an apparatus for discharging, cleaning, and refilling boilers, the combination with means for separating the discharged steam from the discharged liquid, of means for utilizing the discharged liquid as washout water, means for passing the discharged steam through fresh feed water, means for mingling the steam rising uncondensed from the feed water with the washout water, means for conducting the feed water so formed through, without mingling it with, the discharged fluids, and means for finally surrounding the feed water while passing to the boiler with the discharged fluids passing from the boiler.

FRANK W. MILLER.

Witnesses:
  Geo. L. Wilkinson,
  W. T. Jones.